US006877661B2

(12) United States Patent
Webb et al.

(10) Patent No.: US 6,877,661 B2
(45) Date of Patent: Apr. 12, 2005

(54) SCANNABLE BARCODE DISPLAY AND METHODS FOR USING THE SAME

(76) Inventors: Richard M. Webb, 338 Lehigh Ave., Pittsburgh, PA (US) 15232; David W. White, 1039 Milton Ave., Pittsburgh, PA (US) 15281; Omead Amidi, 100 Elmore Rd., Pittsburgh, PA (US) 15221; James Ryan Miller, 315 Summit Ave., Apt. A2, Canonsburg, PA (US) 15317; Timothy Dobbler, 5562 Hobert St., Apt. 418, Pittsburgh, PA (US) 15217

( * ) Notice: Subject to any disclaimer, the term of this patent is extended or adjusted under 35 U.S.C. 154(b) by 267 days.

(21) Appl. No.: 09/932,827

(22) Filed: Aug. 16, 2001

(65) Prior Publication Data

US 2002/0071076 A1 Jun. 13, 2002

Related U.S. Application Data

(60) Provisional application No. 60/225,805, filed on Aug. 16, 2000.

(51) Int. Cl.[7] ................................................ G06K 7/10
(52) U.S. Cl. ................................. 235/462.01; 235/454
(58) Field of Search ................................. 235/454, 455, 235/462.01, 462.06, 462.14, 462.22, 462.43–462.45, 427.01; 705/14, 26

(56) References Cited

U.S. PATENT DOCUMENTS

| | | |
|---|---|---|
| 4,882,675 A | 11/1989 | Nichtberger et al. |
| 5,380,991 A | 1/1995 | Valencia et al. |
| 5,420,606 A | 5/1995 | Begum et al. |
| 5,579,139 A | 11/1996 | Abileah et al. |
| 5,715,028 A | 2/1998 | Abileah et al. |
| 5,973,760 A | 10/1999 | Dehmlow |
| 6,082,620 A | 7/2000 | Bone, Jr. |
| 2002/0023027 A1 * | 2/2002 | Simonds ...................... 705/26 |
| 2002/0070278 A1 * | 6/2002 | Hung et al. ............ 235/472.01 |
| 2002/0091569 A1 * | 7/2002 | Kitaura et al. ................ 705/14 |
| 2003/0047613 A1 * | 3/2003 | Funamoto et al. ..... 235/462.01 |
| 2003/0144035 A1 * | 7/2003 | Weinblatt et al. ........... 455/566 |

FOREIGN PATENT DOCUMENTS

WO     WO 00/57368     9/2000

* cited by examiner

*Primary Examiner*—Daniel Stcyr
*Assistant Examiner*—April Taylor
(74) *Attorney, Agent, or Firm*—Reed Smith LLP

(57) ABSTRACT

A system and method for implementing a wireless data transmission scheme through the use of a display capable of displaying symbolic information, a data acquisition device capable of identifying and capturing said displayed information and a mitigation device adapted to allow the data acquisition device to capture the symbolic information. The symbolic information may be a barcode displayed on an LCD outputting linearly polarized light. The data acquisition device may be a laser scanner, and the mitigation device may be a quarter wave retarder located between the display and the scanner. A larger system may utilize this wireless system or a different front end in a more generalized backend information transfer system. The backend system may include a centralized data center adapted to be used with retail couponing, ticketing, digital receipts, or a plurality of other information systems in which data is used separately from its storage location.

59 Claims, 8 Drawing Sheets

$I = \sin^2 \theta$

SCANNABLE BARCODE DISPLAY AND METHODS FOR USING THE SAME

CLAIM OF PRIORITY

This application claims priority to U.S. Provisional Patent Application No. 60/225,805 filed on Aug. 16, 2000.

BACKGROUND OF THE INVENTION

1. Field of the Invention

The present invention relates to devices and methods for capturing and transmitting wireless information and more particularly relates to devices and methods for scanning barcodes on electronic displays and back end systems for utilizing such scanning as in an electronic couponing system.

2. Description of the Background

Symbolic or other graphics-based representations of information are used in many applications to increase the rate at which information can be sent to and received from multiple entities or devices. For example, barcodes, typically found on products or promotions, encode machine-identifiable digital information on printed matter. An exemplary barcode 100 shown in FIG. 1 includes a series of thick 102 and thin 104 vertical bars spaced in an ordered fashion which represent binary or otherwise encoded information. The decimal equivalent 106 of the embedded information is typically printed below the barcode 100.

A conventional barcode includes information at one or both ends indicating which direction the barcode is oriented (in case it is scanned upside-down), and there may be size or scale information embedded in the barcode. There is also a data section that includes the information encoded in the barcode. Typically, barcodes can be of various sizes and may be scanned at different lengths from the scanner. There may be guidelines that determine various characteristics of the barcodes. Preferably, the barcode scanning system of the present invention may be used with conventional barcodes or with a proprietary data encoding mechanism other than the conventional barcode.

Laser-based scanners or other data recognition and acquisition machines are capable of scanning these printed barcodes to identify and decode the encoded information. The information collected by these scanning machines may be used to tally grocery bills, recognize coupons, and classify books or CDs. Barcode scanners and other data recognition and acquisition devices are prevalent because they save time and are convenient to use.

Barcodes may also be displayed on various media other than printed materials. For example, a dynamic barcode may be electronically displayed on a conventional display, such as a CRT (cathode ray tube) or LCD (liquid crystal display). Scannable barcodes may also exist using any other technology capable of producing machine recognizable barcode line orientations.

Although barcodes may be displayed by a variety of different technologies, the simplified "point and scan" technology does not work with all display technologies. For example, because of the light polarization characteristics of an LCD and the laser light used to scan a barcode displayed on the LCD, merely pointing a barcode scanning laser at an LCD will often not result in a successful capture of information. Specifically, lasers can only scan LCD barcodes in polarization angles which allow light to penetrate the LCD.

Laser barcode scanners use a variety of different laser technologies, some of which are prone to changes in the light polarization angle over time. Further, the manufacturers of different display devices, such as cellular telephone LCDs, often use displays with different light polarization angles for different products. It is therefore not possible to guarantee scannability of LCD barcodes without addressing this problem.

It has been previously suggested in other technical fields to apply a quarter wave retarder to the outside surface of an LCD in order to enable the viewing of the LCD through linearly polarized sunglasses. For example, vehicular applications may include instrument panels comprising LCD displays. The light that comes off of these LCDs is linearly polarized (as described below). Therefore, when viewing the light emitted from these LCDs through linearly polarized sunglasses, the brightness of the LCD screen will vary from 100% of the emitted light down to no light depending on the angle between the polarization angles of the LCD and the sunglasses. These very simple applications using a quarter wave retarder to reduce glare coming off of an LCD do not address the somewhat more complicated two-way laser light propagation (both into and out of the LCD display) envisioned by the present invention.

These "scannable" barcodes can be used as part of a larger information system. For example, traditional printed coupons from a manufacturer or other coupon provider are scanned at a cash register to realize an immediate discount on a purchased product (coupon "redemption"). Thereafter, the coupon can be "cleared" between the store and the manufacturer to reimburse the store for this discount. Because the barcode scanning system used in conventional couponing applications is just one form of wireless information transfer, this conventional system may be extended to a plurality of backend information systems.

A need has therefore been recognized in the art to provide a more general solution to the problem of transmitting information from a variety of display devices to a variety of data recognition and acquisition devices. The solution preferably facilitates the scanning of barcodes using conventional laser scanners and LCDs, as well as a variety of other display and scanning technologies. There is also a need to provide new and different backend solutions for utilizing these data acquisition devices, such as in the electronic couponing industry.

SUMMARY OF THE INVENTION

In accordance with at least one preferred embodiment of the present invention, there is provided a generalized front end data transfer system in which data is transferred through a wireless data connection. The present invention also contemplates a plurality of backend systems for use with this wireless data front end as well as other data transfer front ends.

One aspect of the present invention comprises an LCD display capable of displaying barcodes or other symbolic information that can be scanned by a laser scanner or other data recognition and acquisition device. The system preferably includes a quarter wave retarder which allows light from the scanner to penetrate the LCD for scanning the displayed barcode. The retarder may be manufactured as part of the LCD, or may be removably attached to the LCD such as with a plastic static strip or removable face plate.

The LCD may be part of a cellular telephone, personal digital assistant (PDA) or other wireless device that is capable of communicating through the Internet or other communications medium. The scanner may be a conventional laser scanner such as those found at the checkout counter of retail and other stores.

An electronic couponing system including, among other information transfer methodologies, the barcode scanning system described above, preferably accepts and stores electronic coupons for users of the system and facilitates the redemption and/or clearing of these coupons. Coupons may be added to a users shopping list by direct scanning, selection from an Internet web site, or by other means. The user may redeem the electronic coupons at a store by displaying a barcode representing the coupon on their cellular telephone, PDA, pager or other device. The coupons may be stored locally or at a data center connected to the retail store and the user's device through the Internet.

The devices and methods of the present invention may also be used to replace electronic transaction (payment) cards from a variety of industries. The system may also facilitate a wireless ticketing system for movie theaters, sporting attractions, or other events. The system may also be used for retaining and providing digital receipts that may be downloaded to a user's personal financial software at a later time.

BRIEF DESCRIPTION OF THE DRAWINGS

For the present invention to be clearly understood and readily practiced, the invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

The present invention provides, in at least one preferred embodiment, a system and method for storing, scanning, and redeeming electronic coupons. The system may utilize existing components, such as LCD-based cellular telephones and laser (or other electromagnetic wave-based) scanners to transmit information displayed as barcodes from the telephone to the scanner. A backend system preferably utilizes this information in an electronic couponing or other symbolic data-based scheme, such as ticketing or as a replacement for any magnetic stripe-based or identification card.

Figure 2:
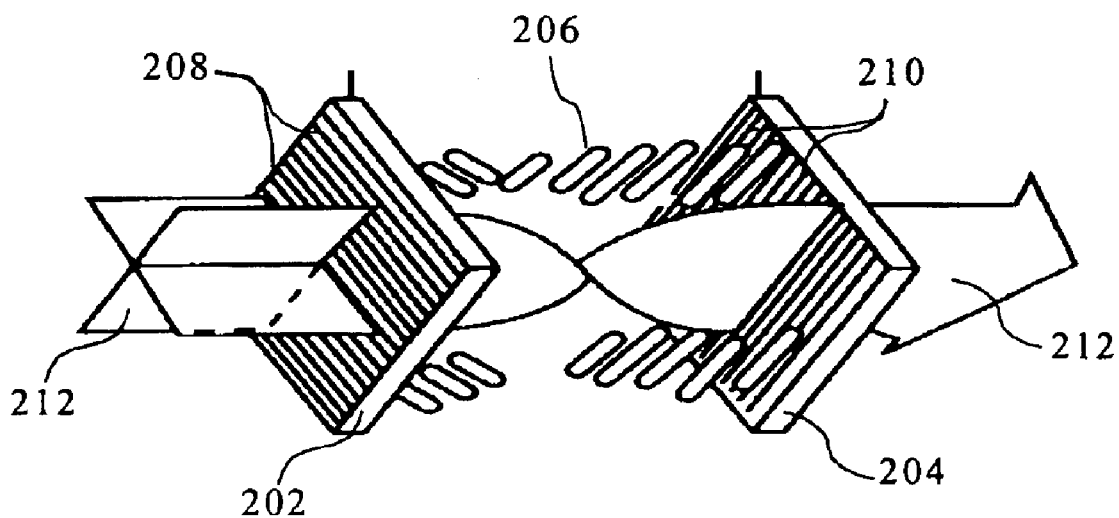
FIG. 2 shows a conventional LCD device.

As briefly described above, one example of a display for use with the present invention is a Liquid Crystal Display (LCD) 200 (see, FIG. 2). An LCD 200 is generally comprised of two polarized pieces of glass 202, 204 or other material with a liquid crystal layer 206 "sandwiched" between the glass. In one typical orientation, each pane of glass 202, 204 is linearly polarized (see, hatch lines 208, 210) and the two opposing panes of glass (hereafter, "lower" 202 and "upper" 204 panes) are placed such that there is a 90 degree difference between the polarization angles of the two planes. Light (represented by arrow 212) that passes through the lower polarization pane 202 will be linearly polarized according to that pane, and the angle of polarization of the light must be rotated 90 degrees (to align with the upper pane 204) in order to pass the full strength of the light wave 212 through the second pane 204.

The liquid crystal layer 206 between the two pieces of glass 202, 204 is preferably capable of changing the polarization angle of light 212 passing therethrough depending upon the orientation of the crystals that make up the layer 206. An electric current is passed through the crystals to change this crystal alignment, and the change in crystal orientation depends upon the amount and polarity of current applied. For example, if the panes of glass 202, 204 are polarized at 90 degree angles with respect to each other, the liquid crystal layer 206 is preferably prepared so as to "bend" (i.e., change the polarization angle) light 212 that passes through the crystal at this 90 degree angle when energized.

The liquid crystal layer 206 may be divided into a grid or other pattern (pixels) by etching horizontal and vertical conductors around the liquid crystal. By "selecting" certain sections of the grid (by either supplying or withholding electric current), visible patterns are displayed on the screen of the LCD 200 (the upper pane of glass 204). The same effect can be obtained by aligning the polarization angles of the lower and upper panes of glass and using the liquid crystal layer in the opposite way. In this additional orientation, the liquid crystals will either pass the light straight through or will bend the light so that it won't pass through the upper pane of glass.

Typically, the LCD 200 uses either reflected ambient light or is lit from the side (collectively, "reflective" LCDs) or has a light source behind the lower pane 202 of glass ("backlit" LCD). The backlit LCD has a light source behind the lower pane of glass 202 and the reflective LCD typically has a mirrored surface on the bottom of the lower pane of glass 202 to reflect ambient or side-generated light up through the liquid crystals 206 polarized by the lower pane 202. In either case, the light 212 corresponding to each display pixel: (1) passes through the lower pane 202 and is linearly polarized; (2) is either bent or not bent by the liquid crystal layer 206; and (3) passes or is blocked by the second pane of glass 204, thereby displaying an image on the screen. The light that leaves the LCD 200 is linearly polarized according to the polarization angle 210 of the second pane of glass 204.

Figure 3:
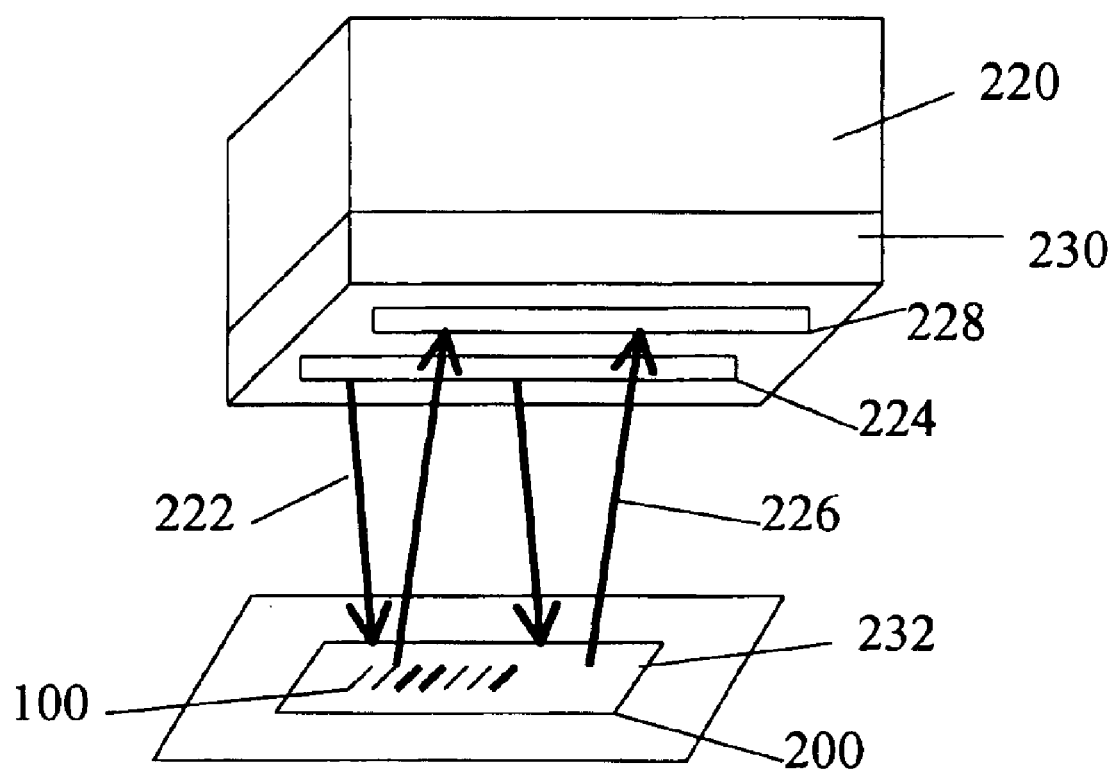
FIG. 3 details one exemplary symbolic data scanning system.

To attempt to "read" or identify data displayed on the LCD 200, an electromagnetic (e.g., laser) scanner or other detection device 220 may be used (see generally, FIG. 3). Generally, a laser scanner 220 works by sending out a plurality of light waves 222 from a line of emitters 224 that reflect off of a target 232 and bounce back 226 toward sensors 228 mounted in the scanner head 230. The scanned surface 232 will reflect the light 226 back to the sensors 228 at different intensities depending upon the distance from the scanner to the target 232 and the color or other characteristics of the scanned surface 232. Depending upon the intensity of the received light 226, the laser scanner 220 can then determine what data was scanned. For example, if a conventional barcode 100 is scanned, the "dark" lines and "light" spaces will reflect light differently and allow the laser system 220 to "read" and identify the barcode 100.

Figure 4:
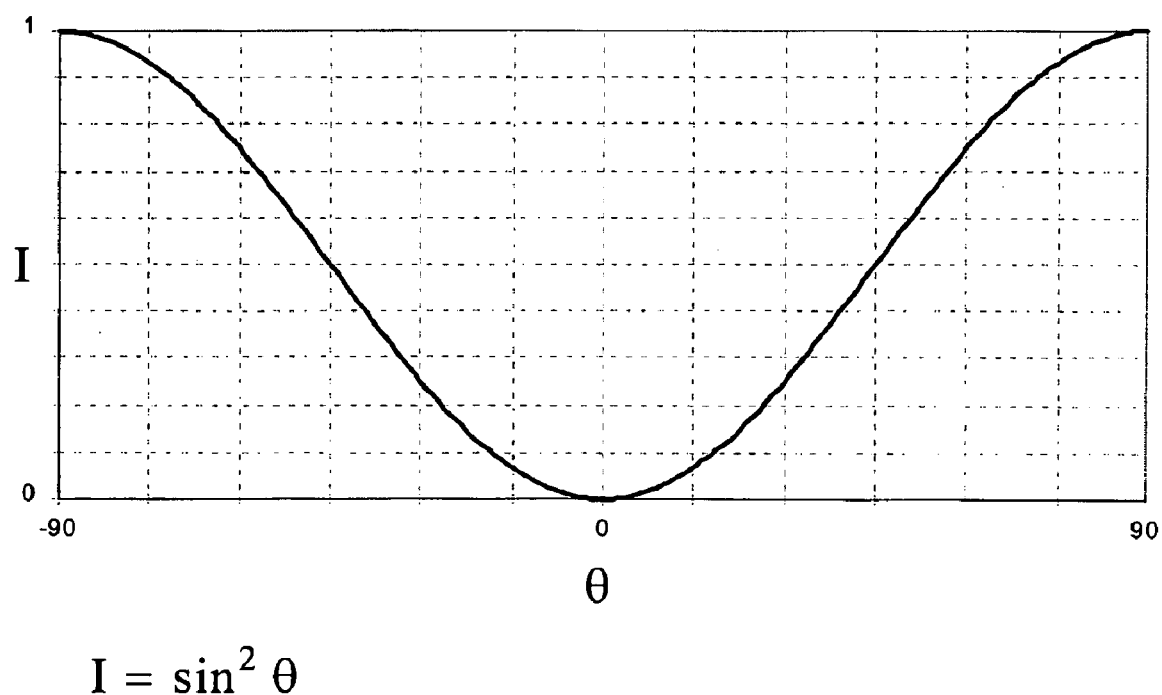
FIG. 4 shows the relationship between the intensity of light that passes through a linearly polarized surface and the angle between the polarization of the laser light and the polarization of the surface.

When the display device is an LCD or other polarized display, laser and other types of scanning methodologies may be more complicated. Because the surface of the LCD is linearly polarized, not all of the scanner's light waves will pass through the LCD surface to read the displayed data. At any one point in time, the laser light can be approximated to be a linearly polarized light wave. Laser light that is collimated with the polarization of the upper surface will pass through unattenuated, and laser light that is polarized at 90 degrees from the polarization of the upper surface will not pass through to any appreciable degree. FIG. 4 depicts the $\sin^2 \theta$ relationship between the intensity of light that passes through the polarized surface and the angle ($\theta$) between the polarization of the laser light and the upper surface.

In order to allow the maximum amount of the laser light to reach the inside of the LCD (and therefore increase the chances of a successful scan), it is desirable to align the polarization of the laser light to the polarization of the upper surface of the LCD. If all of the laser light were able to be aligned with this upper layer, the laser may preferably be able to read and identify different data patterns being displayed on the LCD. However, this process is at least technically infeasible, and at most impossible.

In real-world applications, neither the laser light nor the display polarization angle is always known or knowable. For example, many commonly used lasers, such as some of the helium neon lasers used to scan item barcodes at a grocery store checkout register, have randomly polarized light that changes ("wanders") continually over time. Also, the different manufacturers of LCD-based devices (for example, the manufacturers of different cellular telephone handsets) may each have different orientations for the upper and lower polarization layers. In other words, the LCDs of these devices may be polarized vertically, horizontally, or at any other angle.

The scanning methodology is further complicated because the polarization plane of the laser may be different than the scan plane of the laser. For example, a horizontal barcode displayed on a vertically polarized LCD could be scanned by a device which scans horizontally utilizing a laser beam which is polarized vertically. Any other combination of polarization and scan planes would not produce accurate scans. In sum, there are a great number of variables that need to match between the laser and the LCD in order for barcode or other symbolic information to be successfully acquired, and a more general solution to the problem of adapting conventional scanning technologies to conventional display technologies is desired.

Even if a laser with a controlled and constant polarization angle and a display with a known polarization angle is achieved, a conventional laser could still not be effectively used to scan images on every type of LCD. For example, assume two different cellular telephone LCDs display barcodes horizontally across the screen. Assume further that one LCD is vertically polarized and the other is horizontally polarized. No conventional horizontally scanning laser would be capable of scanning with both vertically and horizontally polarized light. Therefore, conventional systems are limited.

One preferred method for addressing the above-described light polarization problem involves the use of a quarter wave retarder. A quarter wave retarder is a light polarization mechanism comprised of a fast axis and a slow axis that are perpendicular to each other in the plane of the retarder, that is perpendicular to the direction of light propagation through the retarder. Light that is incident on the surface of the quarter wave retarder polarized in line with the fast axis is passed through the retarder with no attenuation. Light incident on the surface of the quarter wave retarder that is in line with the slow axis will be passed through the retarder at full amplitude but will be delayed by ¼ of the wavelength of the light.

Light that is incident on the quarter wave retarder at a polarization angle somewhere between the fast and the slow axis will be broken up into two vector components: one along the fast axis and one along the slow axis that is delayed by ¼ wavelength. The sum of these two vectors represents the light that passes through the quarter wave retarder. In this way, no matter how the laser light is polarized, or even if the polarization changes over time, the quarter wave retarder will "guide" the light into two orthogonally polarized components. Because even randomly polarized light can be "controlled" in this way, the light may be more predictable for uses such as with an LCD display according to the present invention.

It should be noted at this junction that although a quarter wave retarder is the presently preferred mitigation device for use with the invention, it is not the only solution. It is understood that the wavelength of typical laser scanner beams is in a known range. Wave retarders are generally designed to provide the specified shift for a particular wavelength. An effective ¼ wave retarder is chosen for this particular wavelength band. Even if the laser scanner beam wavelength is not exactly matched to the retarder's design frequency, in practice the retarder will still be effective. A ¼ wave retarder for the laser's wavelength is the optimal choice for scannability. However, other retarders (preferably retarders that are not multiples of ½ the light wavelength) close to ¼ wave are also effective, but with reduced performance. Therefore, these other retarders may also be used within the scope of the present invention, although the quarter wave preferred embodiment will be the focus of the disclosure.

Figure 5:
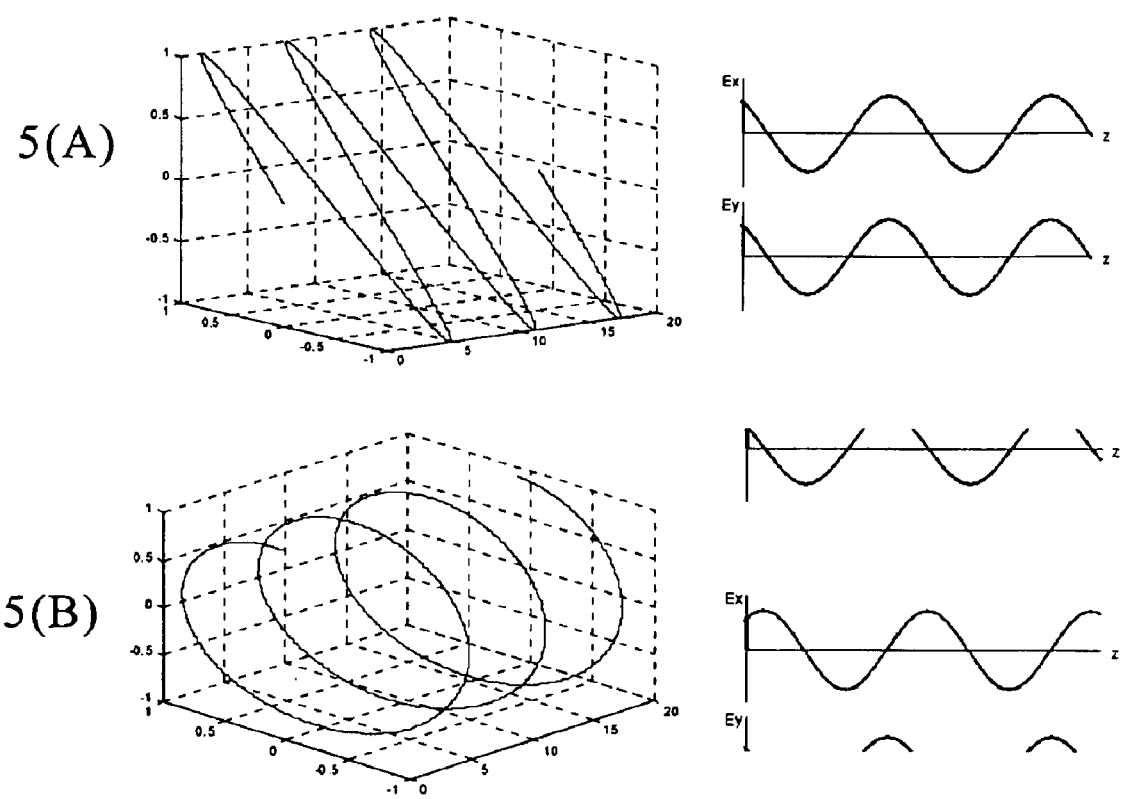
FIG. 5 describes light polarization schemes such as linear polarization 5(A) and circular polarization 5(B)

In greater detail, polarized light can be described with two sinusoids and their relative phase. Linearly polarized light (such as that which leaves an LCD), can be described with two in-phase sinusoids as shown in FIG. 5(A). After passing through a quarter wave retarder the two sinusoids will be out of phase by 90 degrees. As shown in FIG. 5(B), the light will now be circularly polarized but at ½ of the intensity of the incident light. This circularly polarized light can always pass through a linear polarizer such as the panes of an LCD.

Figure 6:
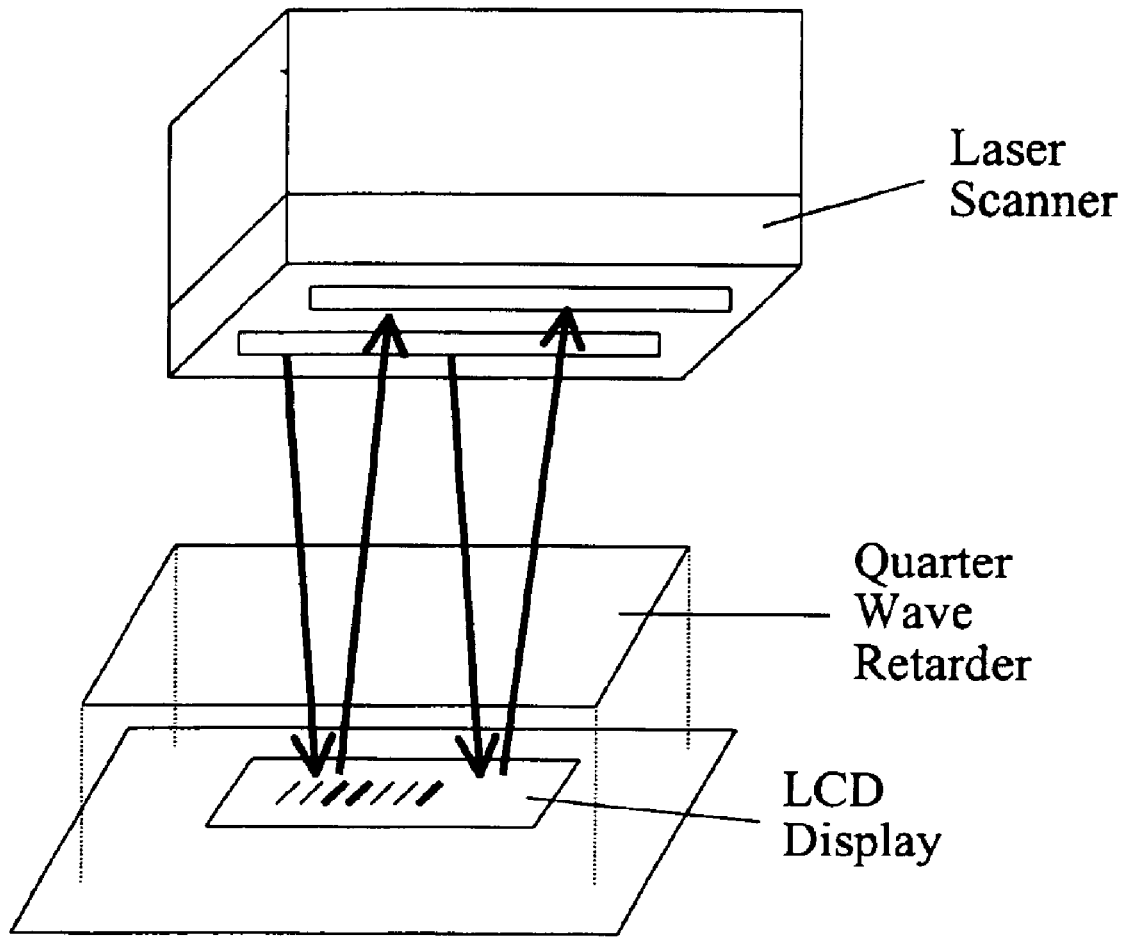
FIG. 6 shows the general configuration of an LCD scanning system according to the present invention.

If a quarter wave retarder layer such as this is applied to the upper surface of the LCD screen in a known way, the scanner may be adapted for use in scanning the LCD. FIG. 6 shows one exemplary embodiment of the scanning system of the present invention including a quarter wave retarder. For example, as stated above, light that is polarized in line with the upper layer of the LCD will pass through it, but light that is orthogonal to the upper surface polarization is blocked. However, light that is polarized at a 45 degree angle to the polarization of the upper surface will pass through this upper surface at approximately ½ the amplitude of the light wave incident on the surface. (see, FIG. 3).

If the quarter wave retarder is oriented such that the fast and slow axes are at 45 degree angles from the light polarization angle of the upper surface of the LCD, the laser (or other) light along both the fast and slow axes of the quarter wave retarder will pass through the upper surface of the LCD at approximately one half of the amplitude of that which is incident on the surface of the quarter wave retarder ($\theta=45°$ in FIG. 3). If this angle ($\theta$) is approximately but not exactly 45 degrees, some approximation of this one half power will pass through the LCD.

Once through the upper LCD surface, the laser light is then: (1) bent (or not bent) by the various sections (pixels) of the liquid crystal layer; (2) is reflected off the lower surface of the LCD (in a reflective light LCD); (3) is bent back to its original orientation by the liquid crystal layer (now traveling in the opposite direction); and (4) exits out of the upper LCD surface in the opposite direction. Because this light is in line with the fast and slow axes of the quarter wave retarder, the laser light will pass through the quarter wave retarder to be sensed and interpreted by the laser scanner. In this way, an image on the LCD can be scanned by a conventional laser scanner or other optical recognition device.

In backlit LCD devices, there is not typically a reflective coating on the lower side of the lower pane of glass. However, the contrast or other characteristics of the backlit LCD may be set so that the laser scanner can reflect back off of the pixels to a sufficient degree in order to be sensed and interpreted by the laser scanner. For example, an electronic filter could be placed over a conventional display in order to change the contrast of the display during the scanning operation. By changing current applied to the filter, the contrast can be altered such that a successful scan will ensue. This contrast alteration may be triggered by the scan, and the display may return to normal after the scanning event. Variations on this theme using electronic filters are contemplated by this disclosure.

In general, the quarter wave retarder takes linearly polarized light and converts it to circularly polarized light. FIG. 5(B) shows a three dimensional representation of the circularly polarized light as it comes out of the quarter wave retarder. This circularly polarized light is capable of penetrating a linearly polarized filter.

Therefore, to generalize this system to various different display technologies and orientations of specific manufactured devices, a quarter wave retarder or other polarization mitigation device is applied or otherwise affixed above the upper pane of the LCD display in such a way so that the angle between the polarization of the upper pane and the polarization of the quarter wave retarder is approximately 45 degrees. In preferred embodiments, the laser scanning system will work best when this angle is exactly 45 degrees, but the system may still operate in an acceptable way when this angle is off by 10 degrees or more.

Because the manufacturers of devices which include LCDs (such as cellular telephone manufacturers) orient the polarization in a limited number of ways (e.g., vertical, horizontal, diagonal), there are many different ways in which the quarter wave retarder layer may be applied to the LCD. For example, a point-of-use employee, such as a grocery store clerk, may have a pre-made selection of "stick-on" plastic quarter wave retarders that can be applied to the LCD screens of consumer electronics devices using static electricity. Preferably, the clerk has a plurality of retarders, each of the different retarders to be used with different phones (or pagers, PDAs, etc.) depending on the polarization angle of the LCD in the phone.

For example, the check-out clerk may have one quarter wave retarder to be applied to cellular telephone screens that are horizontally polarized and a second retarder to be applied to those phones that are vertically polarized. Alternately, one retarder could have multiple alignment indicators on its face which indicate in which orientation the retarder should be applied to any one specific cellular phone. Either of these schemes may include a "master list" of cell phone displays or other devices to be used and the respective polarization orientations of those devices. Once the correct retarder is applied, the local register scanner could be used to scan the barcode on the device by merely aligning the scan plane of the scanner with the displayed barcode.

Some conventional cellular telephones have a removable upper pane of glass, plastic or other material that can be replaced with an alternative pane. For example, some phones come with replaceable upper glass that can be interchanged with glass of a different color or with various border designs. This technology can be used with the present invention to make an interchangeable pane of glass with the appropriately oriented quarter wave retarder embedded therein. Either the "snap-in" or plastic static (or other) versions of the present invention may be color-coded or otherwise identified to enable ease of use at the place of scanning to increase the availability of use. In this way, existing wireless telephones may be used in accordance with the present invention.

In an additional preferred embodiment of the present invention, the cellular telephone LCDs or other displays may be manufactured with the quarter wave retarder already built into the phone. For example, a permanent quarter wave retarder could be deposited directly on the upper surface of the LCD during the manufacturing process. Alternatively, the quarter wave retarder could be intermixed with the linearly polarized upper layer. This solution may be the easiest for the cellular telephone users because all of the technological modifications would already be included in the manufacture of the telephone (invisible to the user). This method may also be preferred because the handset manufacturer may be better able to align the quarter wave retarder and the upper pane of glass to maximize the amount of laser or other scanner light that penetrates the LCD and that is used for scanning purposes. By relying on a replaceable piece of glass or a static plastic "sticker," an additional element of potential misalignment may be introduced into the system.

Also, the quarter wave retarder could be built into the device that houses or incorporates the LCD display as part of a protective coating or other housing. For example, in a "flip-style" cellular telephone, the quarter wave retarder or other mitigation device could be incorporated into a clear plastic cover built into the phone case such that the quarter wave retarder covers the LCD when the phone is closed. When the telephone is flipped open, the quarter weave retarder may no longer cover the LCD, and therefore scanning may only take place when the phone is closed. Other orientations of a quarter wave retarder in this protective casing will be obvious to those skilled in the art.

Other types of scanners, such as a CCD scanner, have been shown to be generally inoperable in the scanning of barcodes on conventional LCDs such as those found on the displays of cellular telephones. However, any barcode which could be scanned by such a scanning technology could be used with the backend systems (including a couponing system) of the present invention described below.

Other consumer electronics-based displays may also be used with the present invention. For example, many Personal Digital Assistants (PDAs) include LCD technology. Some PDA LCDs operate as the above-described cellular telephone example, but many PDAs also include a "touch screen" feature to be used with a stylus or other input device. Generally, the functionality of these touch screens is pressure-based, and the screen itself acts as a light "randomizer—randomly polarizing the light emitted from the LCD. This touch screen could be adapted to be a quarter wave retarder so that it polarizes the light passing therethrough in the same way as described above. It is expected that cellular telephones and other consumer electronics may incorporate various versions of these touch screens, and the use of these devices may be made more effective by including a quarter wave retarder therein.

The scanning methodology of the front end of the present invention may also be used with a pager, LCD-based television, or any other device that may include an LCD or other display that relies on the polarization of light analogous to the above description. This description of the quarter wave retarder as a "mitigation" device preferably can be generalized to digital or photographic-based contrast adjustments which may allow certain displays such as CRTs, OLEDs and LEDs be scanned by CCD and other data acquisition devices.

The above-described methodology details a procedure for adapting certain polarized display devices so that they may be scanned by conventional scanning devices. The following discussion details several backend solutions for utilizing this front end scanning system in data transmission systems such as electronic couponing. It should be noted here that although the above LCD-based displays may be used with the system, any other scanning-based, wired or wireless data transmission front end scheme could also be used with the now-described backend system. For example, displays based on LEDs (light emitting diodes), CRTs, and LCDs as well as data acquisition devices other than laser scanners may be used within the scope of the present invention. Nothing in the above description on a specialized scanning front end is intended to narrow the scope of the back end systems described below.

Figure 7:
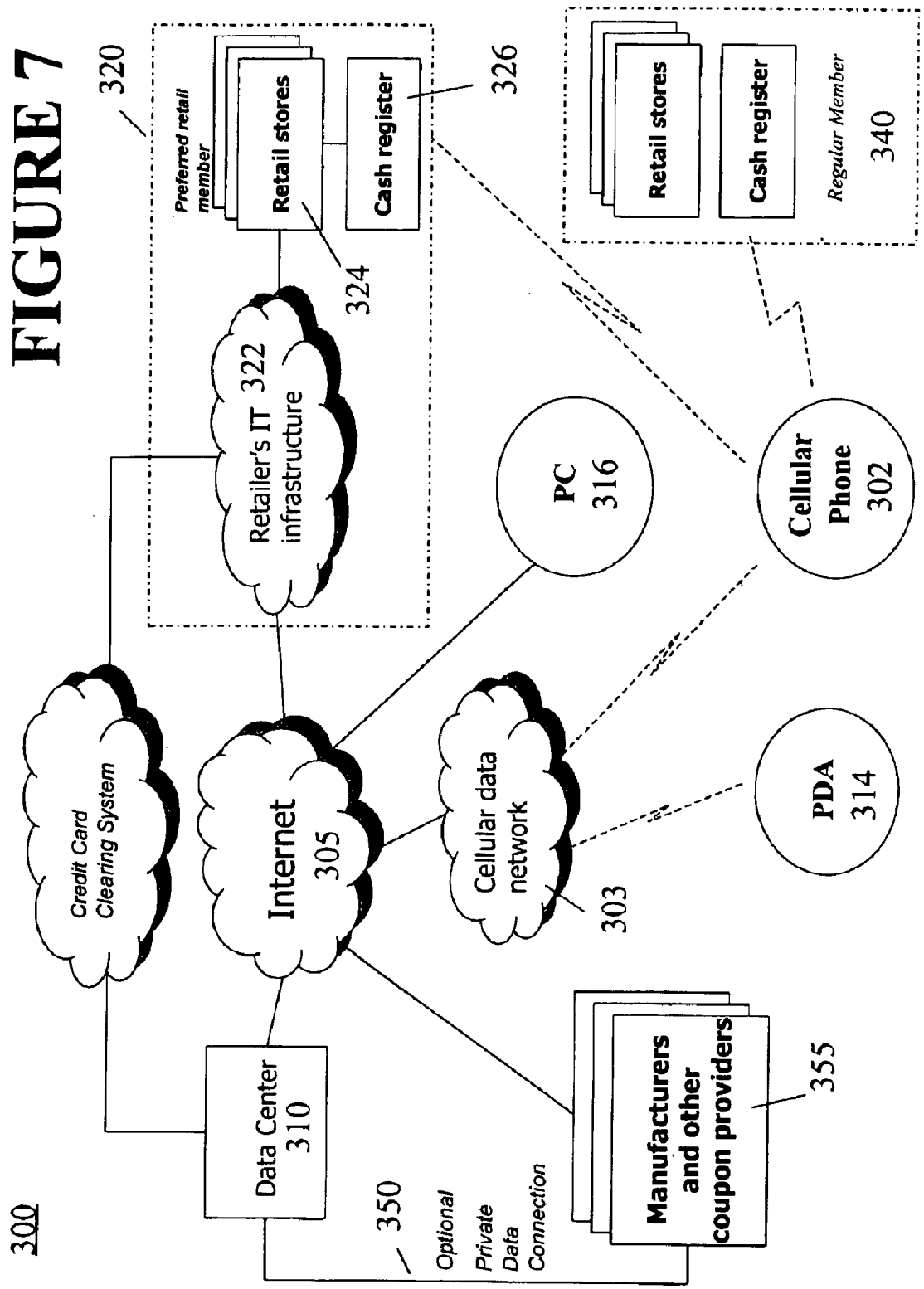
FIG. 7 is a system diagram of an exemplary electronic couponing system.

One exemplary system in which the barcode scanning methodology of the present invention may be used is in the wireless couponing scheme. For example, handheld consumer electronics devices such as cellular telephones may be used as either the input, storage or output mechanism for the storing and/or redemption of wireless digital coupons or "on-line coupons." FIG. 7 shows one exemplary embodiment of a system 300 for the implementation of digital wireless couponing.

A user (consumer) of the system 300 preferably is connected to the Internet 305 by way of a Web-enabled cellular telephone or other device. For example, FIG. 7 shows a Wireless Application Protocol (WAP) telephone 302. WAP is used herein as an exemplary wireless protocol and is also meant to include, for example, a wireless JAVA phone or other device operating on any type of wireless protocol now known or later developed.

The Internet-enabled telephone or other device 302 preferably includes an Internet browser or other application that interprets the data transferred to and from the wireless phone over the Internet 305. For example, the telephone 302 may include a Wireless Markup Language (WML) browser corresponding to a traditional HyperText Markup Language (HTML) browser, although with more limited functionality.

The device 302 may also include a barcode scanning application program interface (API). For example, the device 302 may be a cellular phone that includes a barcode scanner. Preferably, the telephone barcode scanner allows the user to scan a conventional or otherwise represented barcode to enter information into the phone 302. The information included in the scanned barcode may then be stored in an internal memory in the device 302 or may be sent through the cellular telephone network 303 and the Internet 305 or other transmission medium to a separate storage entity 310 (see below). The scanning action may be initiated by selecting a scan" command from a menu displayed on the device 302 or from a separate button on the device.

Figure 1:
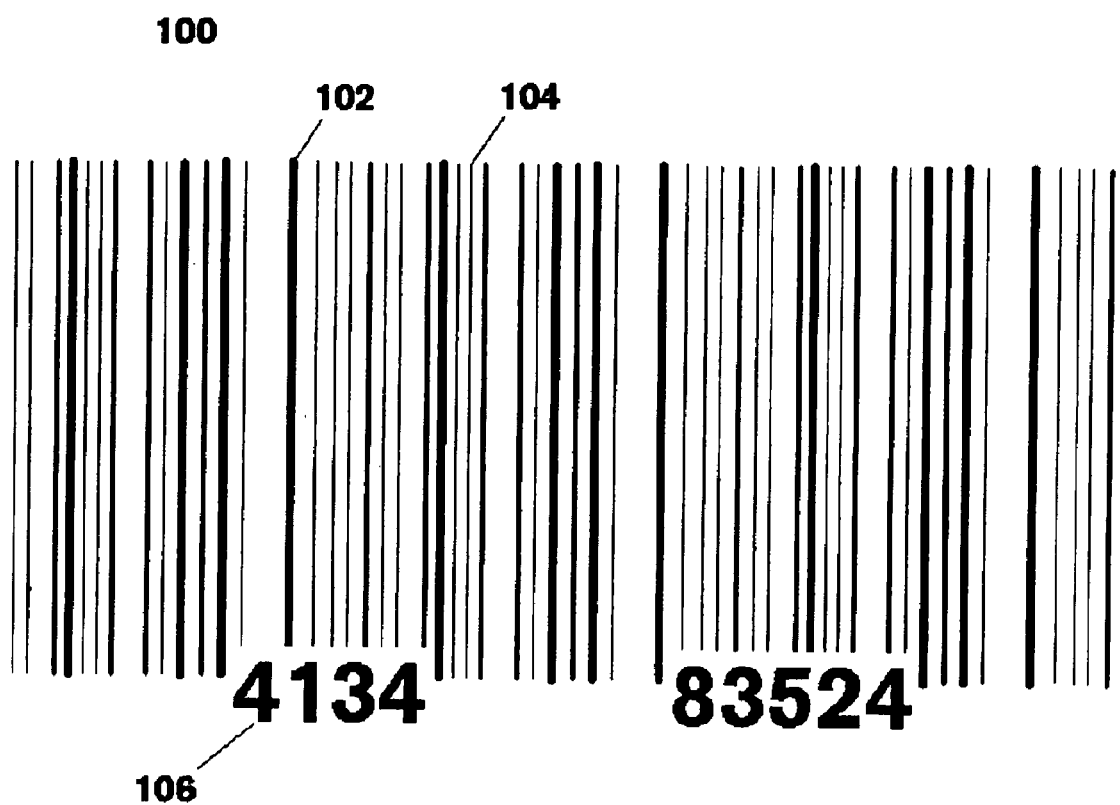
FIG. 1 shows an exemplary barcode.

If the cellular telephone or other device 302 does not include a barcode scanner or other direct data entry device, the system 300 may also allow the user to enter the barcode information by entering the numeric string found below most barcodes. This numeric string (106 in FIG. 1) is generally the decimal equivalent of the encoded binary information in the barcode. This information could also be entered through the cellular phone network 303 via a mobile device such as a PDA 314 or directly through the Internet 305 from a desktop personal computer (PC) 316.

Once one or more sets of barcode (or other symbolic) information data have been scanned and/or stored by the user in the device 302, the coupon information may then be transferred to a central storage location 310 to be used by the consumer at some point in the future. In FIG. 7, there is shown a data center 310 connected to the Internet 305. This data center 310 preferably includes the devices and functionality to store, validate, transmit, and redeem the electronic coupons for a plurality of different users. Barcode or other data information from the user's cellular telephone device 302 may be transferred through the cellular phone system 303 to the Internet 305 and across the Internet to the data center 310 for further processing.

The data center 310 may be associated with a web site that allows various users to monitor their couponing accounts, upload new coupons or perform a variety of other tasks. The data center web site preferably serves both traditional desktop (HTML) personal computer users as well as mobile (WML) users. As new Web publishing formats become available, these formats are also preferably supported. One functionality of the site allows the uploading of newly scanned or entered coupons to the user's account at the data center 310.

The data center site may be designed as a Web portal site that includes many different useful applications for the user. In addition to allowing the user to look up and manage their data center couponing account, the data center web site may also allow the user to view and manage financial accounts and other on-line information.

Once one or more electronic coupons have been stored at the data center 310, the user may view a shopping list of the coupons that are currently available (e.g., stored but not expired) for use by the consumer at a retail store or other redemption center. The shopping list may be a scrollable list of all of the entered coupons for a particular user's account. This shopping list simplifies that user's shopping experience by allowing the user to focus on those products for which the user has an electronic coupon. The shopping list may be viewed by a mobile device (such as cellular telephone 302 or PDA 314) or by a desktop PC 316.

When the user later selects one of the items in the shopping list for purchase at a store, the system 300 preferably "serves" the related coupon (directly or indirectly) to the cash register of the store. For example, assume an electronic coupon for a bag of chips has been scanned and uploaded to the data center 310. When the actual bag of chips are brought to the cash register, the data center 310 serves that coupon to the cash register by some electronic means. According to the present invention, one way in which the coupon may be served is by having the consumer browse the wireless Internet 305 on his or her cellular telephone 302 or other device 314 to get to the data center web site. On the site, the chip coupon can be selected, verified by the data center 310, and then sent to the user on the wireless device. Preferably, the digital coupon is sent to the user's cellular telephone 302 as a barcode that is displayed on the phone's LCD or other display.

As described in more detail above, the conventional laser barcode scanner used at most shopping centers may not be able to directly scan a barcode off of an LCD display. However, by preparing the surface of the LCD with a quarter wave retarder as described above, the conventional laser scanner may scan the electronic barcode in the same way in which it would scan a paper copy of the same coupon (cut from a newspaper or magazine).

The data center 310 preferably begins the coupon redemption process by identifying the user as being the proper owner of the digital coupons and identifying the user to the retailer (the cash register). For example, the data center 310 may send an initial barcode to the user's wireless device 302, 314 that identifies the user. This initial barcode may be a proprietary identification string for the data center 310, it could be an affinity program or other store-based identification number, or it could even be the coupon barcode itself. Although a wide variety of "unique" identification strings can be used, there is preferably some type of identifier communicated from the data center to the checkout register. When this initial barcode is scanned at the case register, the cash register can verify the user with the data center system.

There are many possible alternative ways to signal the cash register during checkout. Alternatives include: a wireless communications scheme could be used to enable the phone to signal the register with identifying information; the previously described identification barcode generated locally or centrally (at the data center); a local or central alphanumeric code may be displayed on the user's phone followed by the cash register operator entering the code into the check out register through the keypad for verification of the user; the phone and the checkout register may be equipped with infrared data ports to send and receive information—the identification string is sent from the user's telephone to the register where the user is verified; a radio frequency (RF) signature could be used; and/or a cellular phone signature could be used in which a local cellular antenna exists at the store which accepts a certain (abbreviated) cellular telephone call that provides identifying information from the user's telephone.

After scanning all of the groceries, the cash register computer preferably queries the data center to determine whether or not a valid coupon relevant to the currently scanned list of goods exists for the identified user. Because most large stores have a well-developed computer infrastructure (for affinity programs, credit card/electronic fund transfer transactions, and other communications-based actions), the present invention preferably utilizes this existing infrastructure to communicate with the data center 310. Retailers 324 that have an extensive Information Technology (IT) infrastructure 322 and who further have a data transfer agreement with the data center 310 are preferably known as "preferred retail members" 320 of the data center 310. These preferred retail members 320 may take advantage of enhanced system 300 features not available to regular retail members 340 of the system.

To query the data center 310 for relevant electronic coupons, there are many different potential schemes. For example, an electronic version of the list of all contents of the current shopping session may be sent to the data center 310, the center can match that list against all of the existing coupons in its database for that particular user, and the center can send a discount code back to the store 324. Once a match is found between a purchased product and a data center coupon, the data center 310 preferably "expires" or otherwise deletes that electronic coupon from its database for that user to prevent the user from using that same coupon again in the future (unless the coupon allows this repeated activity).

Once all of the coupons have been matched and expired, the data center 310 sends a discount code back to the store cash register 326 so that the user's bill for the selected goods may be updated. The discount code may be sent as a series of manufacturer's coupon codes, as proprietary discount codes between the store 324 and the data center 310 (in the amount of the total savings), or in some other format. The store cash register 326 preferably identifies the discount code and updates the bill, and the user can then pay the bill to complete the transaction. In this way, the data center 310 has aided the consumer in the redemption of the electronic coupon(s).

To adapt the present system to existing couponing schemes there may be additional steps that must occur between the data center 310, the store 324 and other parties. For example, if the data center 310 sent the store 324 a regular manufacturer's coupon, the store 324 must clear that coupon with the manufacturer or other coupon provider to be reimbursed for the value of the coupon discounted to the consumer. The cash register magnetic tape and/or some other identifier may be sent to the manufacturer so that the manufacturer can properly credit the store's account for the coupon. This clearing process is often facilitated by a third party with a relationship with both the coupon provider (manufacturer) and the retailer.

If, in the alternative, the data center 310 sent a proprietary (data center sponsored) coupon to the store 324 during the transaction, the data center may be the entity that actually clears the coupon with the coupon issuer. In this case, the data center 310 may send one single "discount coupon" equal to all of the electronic coupons to the store during the checkout procedure. The store must now redeem this coupon with the data center. Thereafter, the data center clears all of the original coupons through each of the different manufacturers that had coupons used. For example, if two electronic coupons for soup from one manufacturer and another coupon for soda from a different manufacturer were used at the retail checkout 326, the data center 310 may provide one single discount code to the store 324 during checkout (which represents the total savings of these three coupons). The store 324 then redeems this coupon with the data center 310 as a single data center sponsored coupon, and the data center 310 must then redeem each of the actual coupons (three in all) from each of the manufacturers (two in all). Because the store 324 only needs to redeem one single data center 310 sponsored coupon, this system may be more convenient for each participating store 324.

In another presently preferred embodiment of the present invention, there may also be a credit card system link between one or more manufacturers or coupon issuers and an end user store 324. When a consumer selects a product and the data center 310 matches that product to a coupon in the user's account at the data center 310, the data center 310 may redeem that coupon in real time using this credit card infrastructure. In this case, the data center 310 preferably determines that a coupon from a certain manufacturer has been validly redeemed, and the data center sends a credit card transaction string from the issuer of the coupon to the store infrastructure 322 and cash register 326 where the user is attempting to redeem the coupon. This methodology works as if the manufacturer or other coupon issuer has a specialized credit card to be used in the redemption of electronic coupons. These coupons can then be instantly cleared upon using this credit card scheme, and the store preferably does not have to go through the later coupon clearing process because the coupon has already been cleared through the manufacturer.

This "instant" coupon redemption system is also advantageous for the store 324 because the store is able to clear the coupon with the manufacturer in real time while the coupon is being used. The store 324 does not need to request clearance of the coupon from the manufacturer and wait 60 days or some other time period in which to get the money from the coupon issuer. The store's accounting methodologies may in this way be kept more current. Transaction costs may also be saved if multiple coupons are used from the same issuer during a shopping trip. Although the credit card transaction costs are typically based on the total purchase price (which would be the same whether sent as one or multiple transactions), the "overhead" transaction costs (such as employee time and computer resources) may be limited by clearing multiple coupons with one credit card transaction.

In an additional preferred embodiment of the present invention, the electronic coupon "matching" process may take place over the IT infrastructure 322 that exists at the store 324. For example, as part of an hourly or otherwise regular batch processing scheme, the data center 310 may send an electronic description of electronic coupons for each user of the data center 310 that also is a member of an affinity or other program associated with a certain preferred retail member 320. The store 324 can then use its existing IT infrastructure 322 to store electronic versions of these coupons associated with the user's store affinity account number or other identification. When the consumer visits the store 324 (or shop's on-line) and selects goods from which the user has an electronic coupon, the store IT infrastructure 322 (rather than the data center) may then match the selected goods in the user's shopping cart against the electronic coupons and determine any discount to be applied to the consumer's bill. Although the batch processing scheme just described may have some inherent communications delays therein, it may be the methodology that is most easily incorporated into the current shopping architecture.

Each of these systems generate user data about the purchasing and coupon redemption practices of various users. Based on the specifics of the redemption or clearing processes, either the store 324 or the data center 310 will have this data to be logged and used subsequently. However, this data could also be sent electronically to another interested entity.

Preferred retail member stores 320 preferably have a data connection directly (or through the Internet 305) between the data center 310 and the preferred retail member store 320. The format of data sent across this transmission line is preferably agreed upon between the data center 310 and the preferred retail member 320 in advance.

There may also be regular retail member stores 340 that allow the use of electronic coupons from the data center 310. These regular retail stores 340 may be smaller, "mom & pop" stores that do not have a well-established computer infrastructure to handle some of the more complicated communications between the data center 310 and the preferred retail store 320. Preferably, these regular retail members 340 have a laser scanner that is used to identify goods and coupons.

In order to use an electronic coupon in a regular retail member store 340, the data center 310 needs to serve the coupon to the user by way of an electronic barcode on the user's cellular telephone 302 or other device 314. For example, the user may use the wireless Internet-enabled device to visit the data center web site and scan through a list of the user's current electronic coupons. If the user selects a product from this list for purchase, the web site may include a selection mechanism whereby the data center 310 is prompted to deliver the barcode coupon to the user's display device (e.g., cellular telephone 302). The data center 310 then sends the barcode information to the user's device 302, 314 over the Internet 305 and/or the cellular telephone network 303, and the barcode indicating the manufacturer's coupon is thereby displayed on the user's device 302, 314.

The user may then go to the checkout at the regular retail member 340 and purchase the item. To receive the proper price reduction from the electronic coupon, the user may give the cellular telephone 302 with displayed barcode to the store clerk to be scanned, and the cash register 342 preferably recognizes the barcode as a coupon and updates the price. At some point in the future, the regular retail store 340 must clear the "used" electronic coupon with the manufacturer or other issuer of the coupon in a way, for example, one of the ways described above. This treats the present system as a provider of paperless electronic coupons.

In order to prevent multiple use of the same electronic coupon according to this methodology, the data center 310 preferably "expires" the electronic coupon as soon as it is sent to the user's cellular telephone 302 or other device 314. Because it may be difficult for the data center 310 to determine whether or not the coupon was actually used, the data center 310 may treat all transmissions of coupons to the user's device 302, 314 as if they had been used.

Multiple coupons may also be used according to this methodology. For example, if the user desired to use multiple electronic coupons in the regular retail member store 340, the user preferably selects the plurality of coupons from the list of electronic coupons either stored in the user's device 302, 314 or existing at the data center 310. Once the multiple coupons are selected and the user checks out, the user is preferably able to cycle through the selected electronic coupons so that the various barcodes corresponding to these coupons may be presented to the cash register for redemption. In a preferred embodiment, the audible feedback (the cash register "beep") may be used to automatically cycle to the next electronic coupon barcode. Therefore, the check out process may be streamlined by repeatedly scanning the cell phone 302, each audible signal advancing through the list of coupons. Because a cellular telephone 302 already includes a microphone, it may be specially suited to this particular methodology.

In addition to the Web-enabled cellular telephone 302 described above, a text pager, PDA 314 or other device may be used to either upload, select or display electronic coupons. As long as the device has some way to communicate with the data center 310 and the cash register 324, 340

(electronically or optically), it is suitable for use with the present invention.

Other devices may be used for various other parts of the present methodology. For example, a consumer may use a traditional wired personal computer 316 to monitor his or her account with the data center 310 and to enter additional electronic coupons into the account. For example, the user may utilize a scanner connected to the computer 316 to scan in coupon barcodes that may be added to his or her account. Likewise, the user may be able to directly enter coupon identification information by typing in the numerical representation of the barcode. Finally, the consumer may browse various manufacturer or other web sites that offer their own electronic coupons. Some of these existing electronic coupons may be transferable to the data center 310 of the present invention. Because on-line coupons come in a variety of ways and are not currently standardized, some prior relationship between the data center 310 and the coupon provider may be necessary.

In addition to having functionality that may allow the user to view and administer their account from the data center web site, the data center web site may also include its own manufacturer's coupons for various products. For example, the data center web site may partner with other sites to provide electronic coupons for the manufacturer's products. Because users of the electronic couponing system are likely to visit the data center web site on a regular basis to administer their account, couponing on the data center site may be a valuable resource for many different manufacturers whose own web sites may not be frequented by the average consumer.

The system 300 of the present invention may also include a direct 350 or indirect link between the manufacturers and other coupon providers 355 and the data center 310. For example, FIG. 7 details an optional private data connection 350 directly between one or more coupon providers 355 and the data center 310. FIG. 7 also shows that this communication may take place indirectly over the Internet 305.

In either case, the manufacturers and other coupon providers 355 may access the data center 310 to determine information pertaining to its provision of electronic coupons. For example, the manufacturer 355 may receive information about the total number or frequency of redemption of its coupons. The data center 310 may provide information regarding the number of consumers that select the manufacturer's coupons and in what stores the users are utilizing the electronic coupons. The varieties of possible data mining opportunities are almost limitless. At the same time, the manufacturers and other coupon providers 355 can provide new coupon information to the data center 310 or manage their accounts in some other way.

When a user signs up to be a member of the data center-based electronic couponing system 300, one of the registration choices may include the ability to receive electronic coupons by email. The data connection between the manufacturers and other coupon providers and the Internet or the data center may also be used to provide these coupons on a regular basis to the users who so desire. The email coupons may be targeted to specifically selected types of coupons, or the coupons may be of a more general variety. Such a received email would preferably contain an HTML link which, when selected, would add that particular coupon to the user's account at the data center.

In addition to the provision of electronic coupons and other information via the data center-based network, the wireless networks of the present invention may also be used as a payment network for the purchases made at the store 324. For example, after a final price (including couponed discounts, if applicable, are generated by the cash register 326), the data center 310 may send a barcode to the user's cellular phone 302 which represents a credit card payment transaction to be used to purchase the selected goods. The cash register laser scanner can then scan that barcode and complete the credit card transaction according to conventional methods, without the use of the actual credit card. In order to use the credit card payment system, the user may be requested to input a personal identification number (PIN) for additional security.

If the symbolic information is sent as a barcode, the payment information sent may be limited because the size of the barcode, and therefore the amount of data that can be displayed on typical cell phones today, is limited. This limitation means that less data can be transmitted from the phone than is currently embedded in the magnetic stripe on the back of a credit card (or other payment device). Therefore, to maximize the usability of the present payment systems, the data center 310 preferably serves a unique barcode to the phone, which is then scanned by the point of sale system. The barcode is preferably of a pre-agreed, proprietary format. The point of sale system transmits the numerical string corresponding to the barcode to the data center 310 over the network/Internet, and the data center 310 responds with the full and necessary information for a conventional credit card transaction. With this "single-use" compacted data format, the full payment information can be used without actually being sent to the user's cellular telephone or other device.

Besides for credit card payment, the present invention could also incorporate an automated payment system that can electronically transfer funds from other sources, such as bank accounts, via an automated clearing house (ACH) transaction. For example, when signing up to use the data center payment system, the user would preferably provide banking information (e.g., a voided check) and would authorize the data center payment system to generate ACH transactions on behalf of the user when requested.

When the user checks out, the user could select to pay with the data center-based ACH system. The user's telephone or other device would preferably communicate a generated ACH number to the cash register (either by scannable barcode or some other scheme as described above). Here again, the barcode could be a one-time use, unique identifier that would be used to query the data center 310. In the preferred embodiment, the data center 310 would then generate and clear the ACH transaction at the close of business on the day of transaction. In so doing, the funds would be transferred from the user's bank account into the store's bank account. This methodology may be preferred because the retailer does not end up with the full account information for the user's bank account—limiting access to the account information of the user limits the potential for fraud. Also, in a preferred embodiment, a second account could be provided (for example, a credit card) which could be used to collect the payment in the event that sufficient funds were not immediately available in the user's bank account (unlike credit cards, one of the downsides of ACH transactions is that there is no way to check for the availability of funds prior to running the batch clearing process). Whenever a transaction with insufficient funds occurs, it may be appropriate to block additional payment transactions from the user's phone for some period of time. In an alternative embodiment, the store 324 could query the data center 310 using the barcode identifier string, receive from the data center 310 the ACH transaction string and run the ACH clearing process without further involvement from the data center 310.

The store IT infrastructure 322 could then clear the ACH transaction according to conventional banking practices. With this system, the ACH transaction could either be cleared by the data center 310 itself (in which the funds would later be transferred to the store 324 by a batch process) or by the store 324 in its normal batch process of ACH transactions.

The cellular phone-based ACH transactions would preferably be based on the banking routing number on conventional paper checks. In order to increase security, the user would preferably be requested to enter a personal identification number (PIN) or other security code to verify use of the ACH methodology. This PIN may be verified either locally by the cellular phone or centrally by the data center 310. Other security features may include using privacy algorithms to encode/decode information transmitted from the data center 310 to and from the phone 302 and to and from the retailer 324 and/or using a date/time stamp to validate the single use code in communication between the data center 310 and the retailer 324.

In both the credit card and the ACH scheme, the system 300 preferably includes a two step process. Initially, the consumer makes a request to purchase goods, and this request is transmitted to the data center 310. After some type of verification, the data center 310 then transmits a single use ACH or credit card identifier back to the store's IT infrastructure 322 (either directly or through the user's phone 302). After acceptance, the single use string is sent back to the data center 310 where it can be converted into a true ACH or credit card transmission string to be cleared through traditional processes. These more sophisticated payment systems may require the enhanced IT infrastructure 322 found in, for example, the preferred retail member stores 320 and which may not be found at some of the regular retail stores 340.

Figure 8:
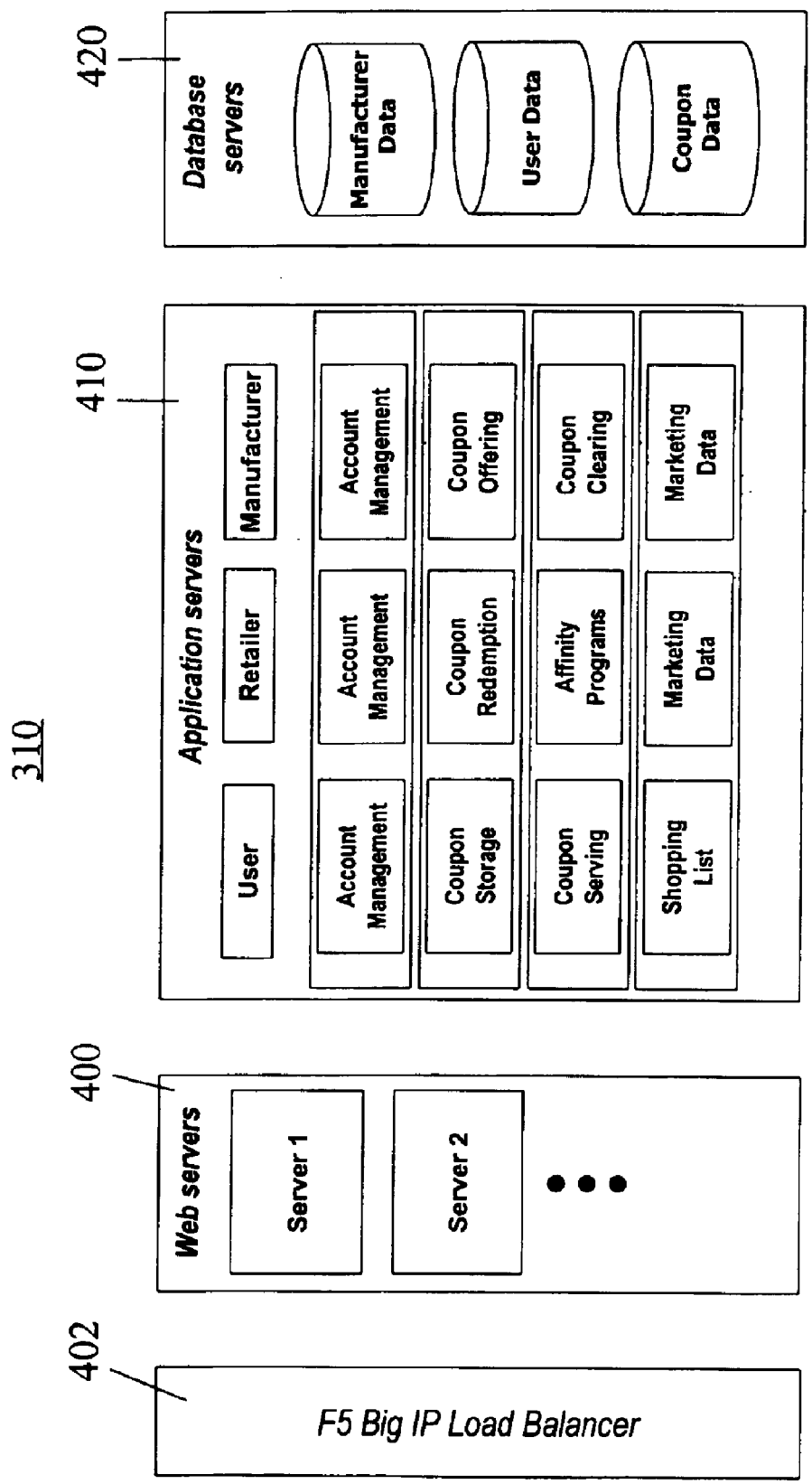
FIG. 8 shows an exemplary data center system.

FIG. 8 details one exemplary embodiment of a data center 310 for use with the present invention. FIG. 8 generally shows a plurality of web servers 400, application servers 410, and database servers 430 for the processing, storage, and transmission of information. There is also shown an Internet Protocol (IP) load balancer 402 to more evenly balance the communication load across the plurality of Web servers 400. The IP load balancer 402 makes the data center 310 scalable at any time in the future.

The plurality of web servers 400 preferably handle all of the communications to and from the data center 310. The web servers 400 provide all of the web pages to be viewed by the users of the system 300, and the servers 400 accept all of the incoming information (requests and data) from the system 300. Preferably there exist a sufficient number of servers 400 to handle the communication load, and the servers provide information in both an HTML and WML format (as well as other and future data formats) to provide access from both wired and wireless Internet devices. These servers 400 use the information and functionality of both the application servers 410 and the database servers 420 that also exist as part of the data center 310.

The application servers 410 preferably provide the software functionality for the various users of the system 300 to take advantage of the various features of the system. These users include the coupon users ("consumers"), the retailers who run the stores in which the coupons are redeemed, and the manufacturers or other coupon providers that monitor the activity of coupon use.

The user functionality of the application servers 410 preferably includes account management, coupon storage, coupon serving, shopping list, and other features. The account management may oversee the registration and administrative features of the user's account. The coupon storage handles the storage of coupons from various sources, and the coupon serving provides a method to present electronic coupons to the users for storage. The shopping list programs may administer the user's coupons as a shopping list and/or may be involved with matching an actual list of requested purchases sent by the retailer for matching with the list of electronic coupons.

The retailer functionality preferably includes, among other features, account management, coupon redemption, affinity programs, and marketing data. The account management performs the administrative tasks, and the coupon redemption oversees the redemption of electronic coupons at a particular retailer's store. The affinity programs section may include functionality for interacting with a pre-established affinity card program run by the retailer, and the marketing data generally controls all of the data mining information about purchasing and coupon redemption activity that may be useful for a retailer or other entity.

The manufacturer section of the application servers 410 preferably includes an account management, coupon offering, coupon clearing, and marketing data section. The account management and marketing data section may be the same as described above with respect to the other sections. The coupon offering section preferably includes the ability to accept and process electronic coupons to be offered on the data center web site on behalf of the manufacturer or other coupon provider. The coupon clearing program includes the functionality to actually clear the manufacturer's coupons as part of the electronic couponing system.

All of these application servers 410 and server software are preferably based on a combination of off-the-shelf e-commerce software and proprietary programs. They may be run on typical application servers as are known in the art.

The final section of FIG. 8 includes a plurality of data servers 420 that house the various information that is used by the system. This information may include manufacturer data, user data, and coupon data. The manufacturer and user data includes both registration and administrative information as well as data specifically applicable to each user or manufacturer. The coupon data preferably includes all of the data about the coupons offered as part of the electronic coupon system according to the present invention. These databases may be typical SQL databases that are specifically configured for use with the present invention.

In addition to the FIG. 8 elements, for the clearing of ACH or other bank transactions, there may be a private data connection between the data center 310 and one or more banks. Only banks have the ability to process ACH transactions, so this link is preferred. The data center 310 may process the accumulated ACH transactions as part of a batch process, for example on a daily basis. These batch transactions would basically include a two step process. First, a batch transaction would be sent to the bank over the private data network that included all of the ACH transactions from the users' accounts to the data center 310. Each line of this batch transaction would preferably electronically transfer some amount of money from the bank accounts of the various users of the system to a bank account used for pooling the payment amounts.

In a second batch process, or in a later section of the same batch process, ACH transactions would be cleared to distribute the funds from the account used to pool the payment amounts into the bank accounts of the various retailers. The amount of funds that are distributed to each retailer would be equivalent to the amount of money spent at that retailer by users of the system minus a transaction fee charged by the data center. In this way, the ACH clearing process may be simplified from the retailers point of view. A great number of these transactions currently occur each day, and the present invention would utilize similar transactions to these existing transactions. Preferably, the data center would be able to work with only one bank, as all ACH transactions can be cleared through a single bank regardless of from which bank the money will be withdrawn or transferred.

Additionally, the couponing backend of the present invention could incorporate various additional time-saving features. For example, while browsing products at a retail store, the user could scan the barcode from a desired product to "query" for a possible price reduction. For example, the scanned barcode could be used by the store infrastructure or the data center to determine whether a price reduction is proper. This price adjustment may be based on intelligent factors such as the inventory level for that particular good, the time of season, a particular manufacturer or store promotion, customer product interest shown by other sales' figures, or any other relevant information. This data could be accumulated from a variety of stores and stored at the data center or store computer infrastructure.

Although the above examples all center around the provision of electronic coupons or payment in a retail-based commercial network, the general system of the present invention may also be used in a wide variety of different industries. For example, a health care provider system could be implemented wherein the health care information exists as part of the data center. Instead of carrying around a health care card that includes a magnetic strip or other identification information, the information could be sent to the user's cellular telephone or other device to be transmitted to the hospital computers. This information may be provided as a barcode or in a variety of other wireless schemes as described above.

Generally speaking, any membership program in which information is separated from the use of that information could be adapted to utilize the present invention. To "unlock" this stored information, the system can send a scannable barcode or other information to the users device, and this information can be transmitted to the computer that desires to access this information as described herein. Any card with identifiable information (magnetic strip) may be replaced with the single cellular telephone or other device according to the present invention. Some examples of systems that may utilize this technology include driver's license, car insurance information, medical insurance information, and others.

If the cellular telephone includes a barcode scanner as described above, additional features may allow the transfer of information from one phone to another. For example, after a car accident, automobile insurance information could be transferred between parties by scanning a barcode on each other's phones. The phone could then interpret the barcode information into the proper insurance information. This may aid in accuracy and speed of information transfer. Likewise, if you got pulled over for speeding, the police officer could scan your phone to get up-to-date information about your driving record.

Because you would only need one single device to replace all of the different magnetic strip and identification cards in your wallet, the burden of replacing these cards when lost may also be lessened. If a wallet is lost, each card must be replaced individually—no centralized "reorder" place exists. With the present invention, on the other hand, all of the data represented by these cards exists in a centralized or distributed place away from the cellular telephone itself. If the phone is lost, only the phone needs to be replaced. The new phone will still be able to utilize the information. If someone finds your lost phone and attempts to use it, the PIN or other security measures preferably stop that person from accessing and utilizing your information. The phone or other device becomes merely a vehicle for the information rather than the cards themselves—which may be a target for thieves.

Besides for replacing specific cards, the present invention may also be used to replace more general identification information such as tickets to a movie, baseball game, plane, concert or other event. For example, a ticket could be ordered on-line and a barcode for that ticket could be sent to your cellular telephone or other device via the wireless Internet. At the event, the barcode could be displayed and scanned for admittance to the event. Additionally, the ticket could be purchased from a Web-enabled cellular telephone. Rather than waiting at the box office at the stadium, a user could call the ticket officers web site, order the ticket, and present the barcode for scanning all at the stadium on the day of the event.

As an extension of the above concepts, the present invention infrastructure could also be used to provide digital receipts. For example, when purchasing goods via the present invention at the grocery store, the store may not provide a paper receipt. Because the shopping list and payment information was provided to the data center during the transaction, the data center may prepare an electronic receipt to be later downloaded to financial software on a personal computer or other device. This digital receipt may aid the user in cataloging purchases and entering information into digital record books.

As a final note, other types of barcode representations could be used with the above backend systems within the teachings of the present invention. For example, barcodes may be dynamically displayed using a set of micro-machined paddles representing each bar on a carrier platform. The paddles may statically stable and require no electrical current to maintain position. Current is preferably only required for transitioning paddles.

Also, a transparent polymer with integrated hollow columns can display a barcode. In effect, this display simulates a small credit card-sized media with a dynamically programmable barcode. On one side, the polymer houses a supply of opaque magnetic liquid, which can be pulled into the columns through semi-permeable membranes or valves. Similarly, the coils can push out the liquid by changing the polarity of the magnetic field. A small micro-controller preferably carries out the necessary operations including energizing a small magnetic coil located atop of each column to pull the liquid metal into the column. Barcodes can be stored in an on-board non-volatile memory (flash, etc.) for future display. New barcodes can be fed to the card by energizing the coils externally. Direct digital transmission of barcodes can be carried out optically by exciting the card's photo detector sensor. Common LEDs or other illumination sources can be configured to send light patterns representing barcodes.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A wireless communications system, comprising:
   a display for displaying symbolic information by emitting linearly polarized light;
   a symbolic data acquisition device for identifying said symbolic information using electromagnetic waves; and
   a mitigation device oriented between said display and said data acquisition device.

2. The communications system of claim 1, wherein said mitigation device changes the polarization angle of light emitted from said symbolic data acquisition device such that the emitted light is not planar.

3. The communications system of claim 1, wherein said mitigation device is a wave retarder.

4. The communications system of claim 1, wherein said mitigation device is a quarter wave retarder.

5. The communications system of claim 4, wherein said display is a Liquid Crystal Display (LCD).

6. The communications system of claim 5, wherein said LCD is incorporated into a cellular telephone.

7. The communications system of claim 6, wherein said telephone includes a barcode scanner.

8. The communications system of claim 6, wherein said symbolic information is a barcode.

9. The communications system of claim 8, wherein said telephone is connected to the Internet.

10. The communications system of claim 5, wherein said LCD is incorporated into a personal digital assistant.

11. The communications system of claim 5, wherein said LCD is incorporated into a pager.

12. The communications system of claim 5, wherein said LCD is incorporated into a computer.

13. The communications system of claim 4, wherein said data acquisition device is a laser scanner.

14. The communications system of claim 13, wherein the polarization angle of the light emitted from said laser scanner changes over time.

15. The communications system of claim 4, wherein said quarter wave retarder is removable from said display.

16. The communications system of claim 15, wherein said retarder is attached to said display by a plastic static sheet.

17. The communications system of claim 15, wherein said retarder is attached to said display by a removable plastic or glass face on the display.

18. The communications system of claim 15, wherein said removable retarder is marked with a plurality of orientation symbols to facilitate the application of the retarder to multiple displays with different light polarization planes.

19. The communications system of claim 15, wherein said removable retarder is color-coded to correspond to displays with a specific polarization plane.

20. The communications system of claim 4, wherein said retarder is manufactured as part of said display.

21. The communications system of claim 4, wherein said retarder is manufactured as part of a protective casing of a device that incorporates said display.

22. The communications system of claim 21, wherein said device is a flip-style cellular telephone.

23. The communications system of claim 4, wherein said symbolic information is a barcode.

24. The communications system of claim 4, wherein said display is incorporated into a device that is connected to the Internet.

25. A wireless communications method, comprising the steps of:
    displaying symbolic information on a display which outputs linearly polarized light;
    providing a mitigation device between the display and a data acquisition device; and
    acquiring the symbolic information from said display utilizing electromagnetic waves emitted from said data acquisition device.

26. The communications method of claim 25, wherein said mitigation device is a quarter wave retarder.

27. The communications method of claim 26, wherein said data acquisition device is a laser scanner.

28. The communications method of claim 26, wherein said symbolic information is a barcode.

29. The communications method of claim 26, further comprising the steps of:
    inputting said symbolic information; and
    storing said symbolic information before said step of displaying said symbolic information.

30. The communications method of claim 29, wherein said inputting step comprises scanning a barcode.

31. The communications method of claim 30, wherein said barcode is a manufacturer's coupon.

32. The communications method of claim 30, wherein said scanning step utilizes a cellular telephone barcode scanner.

33. The communications method of claim 29, wherein said inputting step comprises selecting a coupon barcode from a web site.

34. The communications method of claim 29, wherein said inputting step comprises selecting a coupon designation from a received email message.

35. The communications method of claim 29, wherein said inputting step comprises selecting a coupon designation from a received pager message.

36. The communications method of claim 29, wherein said inputting step comprises the steps of:
    scanning a barcode on a product; and
    receiving coupon information via the Internet related to said scanned product.

37. The communications method of claim 36, wherein said received coupon information is an adjustment in the price of said scanned good based on intelligent factors selected from the group consisting of inventory level, time of season, manufacture promotion, store promotion, and customer product interest.

38. The communications method of claim 25, wherein said mitigation device is a retarder.

39. The communications method of claim 25, wherein said display is an liquid crystal display.

40. A system for transmitting information, comprising:
    a data entry device for inputting information;
    a data center for storing said information;

a point-of-use computer for utilizing said information; and a display device in communication with said data center for communicating said information to said point-of-use computer via a wireless data link, wherein the display device includes a mitigation device, and wherein said information is a barcode identifying a consumer credit card, bank card, membership card, or identification card.

41. The system of claim 40, wherein said display device further comprises a quarter wave retarder and said point-of-use computer comprises a laser scanner, further wherein said scanner acquires said information displayed on said display device as a barcode.

42. The system of claim 41, wherein said display device emits linearly polarized light.

43. The system of claim 42, wherein said display device is an LCD.

44. The system of claim 43, wherein said display device is a cellular telephone.

45. The system of claim 41, wherein said data center clears credit card transactions.

46. The system of claim 41, wherein said data center clears automated clearing house (ACH) transactions.

47. A method for transferring information, comprising the steps of:

entering information into a system for storage;

storing said information;

displaying a scannable symbol related to said information on a display that outputs linearly polarized light; and scanning said symbol to acquire data related to said symbol, wherein said symbol is a barcode, further wherein said scanning step takes place on a point-of-use computer including a barcode scanner, and further wherein said display is an LCD with a quarter wave retarder attached thereto.

48. The method of claim 47, wherein said stored information is communicated to said display via the wireless Internet.

49. An electronic couponing method, comprising the steps of:

storing coupon identification information in an electronic database at a data center;

selecting at least one item for purchase at a retail store;

determining if an electronic coupon for at least one of said at least one item exists in the database; and redeeming said coupon at the retail store, wherein said selection occurs on a web-enabled telephone, and further wherein said telephone includes an LCD with a quarter wave retarder.

50. A payment method, comprising the steps of:

storing payment information about a consumer in a data center;

sending identification information about said consumer to a point-of-sale computer;

receiving identification verification about said consumer from the point-of-sale computer; and completing a payment transaction with the aid of the data center, wherein said identification information is a barcode received through a mitigation device with information pertaining to an automated clearing house transaction.

51. The method of claim 50, wherein said identification information is a barcode with information pertaining to a credit card transaction.

52. The method of claim 50, wherein said stored payment information includes consumer account information and an authorization to debit said account.

53. The method of claim 50, wherein said step of sending identification information about said consumer to a point-of-sale computer further comprises:

serving a barcode including said identification information to a wireless consumer device with a display;

displaying said barcode; and scanning said barcode with a laser scanner connected to the point-of-sale computer.

54. The method of claim 53, wherein said display emits linearly polarized light.

55. The method of claim 54, wherein said display is an LCD including a wave retarder.

56. The method of claim 55, wherein said consumer device is connected to said data center by a wireless Internet connection.

57. The method of claim 56, wherein said step of completing a payment transaction comprises generating a full automated clearing house (ACH) transaction to be served to a bank.

58. The method of claim 57, wherein said ACH transaction is served to the bank from the data center.

59. The method of claim 56, wherein said step of completing a payment transaction comprises generating a full credit card transaction to be served to a credit card clearing house.

* * * * *